United States Patent
Zhu et al.

(10) Patent No.: US 11,386,099 B2
(45) Date of Patent: Jul. 12, 2022

(54) METHODS AND APPARATUSES FOR SHOWING TARGET OBJECT SEQUENCE TO TARGET USER

(71) Applicant: ALIPAY (HANGZHOU) INFORMATION TECHNOLOGY CO., LTD., Zhejiang (CN)

(72) Inventors: Jun Zhu, Hangzhou (CN); Yuanbo Chen, Hangzhou (CN); Shuai Xiao, Hangzhou (CN); Jian Ma, Hangzhou (CN); Zaifan Jiang, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/349,861

(22) Filed: Jun. 16, 2021

(65) Prior Publication Data
US 2022/0067055 A1  Mar. 3, 2022

(30) Foreign Application Priority Data
Aug. 28, 2020 (CN) .......................... 202010885692.8

(51) Int. Cl.
G06F 7/00 (2006.01)
G06F 16/2457 (2019.01)
G06F 3/14 (2006.01)

(52) U.S. Cl.
CPC .......... *G06F 16/24578* (2019.01); *G06F 3/14* (2013.01)

(58) Field of Classification Search
CPC .............................. G06F 16/24578; G06F 3/14
USPC .......................................... 715/200; 707/723
See application file for complete search history.

(56) References Cited

U.S. PATENT DOCUMENTS

| | | | | |
|---|---|---|---|---|
| 7,689,615 B2* | 3/2010 | Burges | ................ | G06F 16/9535 707/723 |
| 8,126,883 B2* | 2/2012 | Qiu | ...................... | G06F 16/334 707/723 |
| 9,799,327 B1* | 10/2017 | Chan | ....................... | G06F 40/12 |
| 2014/0250115 A1* | 9/2014 | Yang | ....................... | G06F 16/58 707/728 |
| 2016/0351188 A1* | 12/2016 | Rao | ........................ | G06N 3/084 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

* cited by examiner

*Primary Examiner* — Manglesh M Patel
(74) *Attorney, Agent, or Firm* — Fish & Richardson P.C.

(57) ABSTRACT

Methods, systems, and apparatus, including computer programs encoded on computer storage media, are provided for displaying a target object sequence to a target user. One of the methods includes determining an initial ranking of a plurality of target objects in a target object sequence. A plurality of object features corresponding to the plurality of target objects are obtained. The plurality of object features are input, based on the initial ranking, into a reranking model. The plurality of object features are encoded to obtain a context representation vector corresponding to the target object sequence. A reranking of the plurality of target objects is obtained based on the context representation vector. The target object sequence is displayed to the target user based on the reranking of the plurality of target objects.

20 Claims, 6 Drawing Sheets

Show a target object sequence based on the initial ranking

Show a target object sequence based on the reranking

METHODS AND APPARATUSES FOR SHOWING TARGET OBJECT SEQUENCE TO TARGET USER

CROSS-REFERENCE TO RELATED APPLICATIONS

This application claims priority to Chinese Patent Application No. 202010885692.8, filed on Aug. 28, 2020, which is hereby incorporated by reference in its entirety.

TECHNICAL FIELD

One or more embodiments of the present specification relate to the field of computers, and in particular, to methods and apparatuses for showing a target object sequence to a target user

BACKGROUND

At present, a target object sequence is often shown to a target user to recommend multiple target objects in the target object sequence to the target user. In order to achieve a specific service objective, it is necessary to select multiple target objects that a user may be interested in from a large number of target objects to form a target object sequence, and determine positions of various target objects when showing the target object sequence. These are performed based on the ranking of the target objects.

In the existing technology, the target objects are often ranked in descending order of correlation degrees between the various target objects and the target user. The correlation degrees reflect the preference of the target user to the target objects. It is often impossible to maximize user feedback when the target object sequence is shown to the target user based on the previously described ranking, for example, to maximize the click-through rate of the target user to the various target objects, to maximize the conversion rate of the various target objects, or etc.

Therefore, an improved solution is desired to reasonably rank the target objects, so as to maximize the user feedback when showing the target object sequence to the target user based on the ranking.

SUMMARY

One or more embodiments of the present specification describe methods and apparatuses for showing a target object sequence to a target user, so as to reasonably rank the target objects, to maximize the user feedback when showing the target object sequence to the target user based on the ranking.

In a first respect, a method for showing a target object sequence to a target user is provided, and the method includes: the initial ranking of various target objects in a target object sequence to be shown is determined, where the initial ranking is performed in descending order of correlation degrees between the various target objects and the target user; object features respectively corresponding to the various target objects in the target object sequence are obtained; the object features respectively corresponding to the various target objects are input, based on the initial ranking, into a pre-trained reranking model, where the reranking model includes an encoder and a decoder, the encoder encodes the various object features to obtain a context representation vector corresponding to the target object sequence, and the decoder outputs the reranking of the various target objects in the target object sequence based on the context representation vector; and the target object sequence is shown to the target user based on positions of the reranked various target objects.

In one possible implementation, the step that the object features respectively corresponding to the various target objects in the target object sequence are obtained includes: attribute features respectively corresponding to the various target objects in the target object sequence are obtained; the correlation degrees between the various target objects and the target user are obtained; a user feature of the target user is obtained; and an object feature corresponding to any target object is formed by combining an attribute feature of the target object, a correlation degree between the target object and the target user, and the user feature of the target user.

Further, the reranking model is used to predict preference degrees of the target user to the various target objects, and rerank the various target objects based on the predicted preference degrees; the reranking model is trained based on a sample object sequence; various sample objects in the sample object sequence have the initial ranking; the various sample objects have corresponding object features; the object feature is formed by combining an attribute feature of a sample object, a correlation degree between the sample objects and a sample user, and a user feature of the sample user; and the sample object sequence has a sample label representing the user preference of the sample user to the various sample objects.

Further, the sample label is determined based on historical behavior data of the sample user.

Further, the historical behavior data include at least one of click data or conversion data.

In one possible implementation, the encoder is a transformer network; the step that the encoder encodes the various object features includes: the transformer network encodes the various object features based on a multi-head attention mechanism to obtain the context representation vector corresponding to the target object sequence.

Further, the step that the transformer network encodes the various object features based on a multi-head attention mechanism includes: query vectors, key vectors, and value vectors respectively corresponding to the various object features are determined; a weight of a second object feature to a first object feature is determined based on a query vector corresponding to the first object feature and a key vector corresponding to the second object feature, where the first object feature and the second object feature are any two object features in the various object features; and an encoding vector of the first object feature is determined based on weights of the various object features to the first object feature and the value vectors of the various object features, so as to obtain encoding vectors corresponding to the various object features.

Further, the decoder includes a fully connected layer, a regression layer, and an output layer; the step that the decoder outputs the reranking of the various target objects in the target object sequence based on the context representation vector includes: the fully connected layer processes the context representation vector into a first output vector, where the first output vector has the same number of dimensions as the various target objects; a softmax function is applied to the first output vector on the regression layer to obtain scores of the various target objects; and the output layer outputs the reranking of the various target objects in the target object sequence based on a descending order of the scores of the various target objects.

In one possible implementation, the encoder is a recurrent neural network (RNN); the step that the encoder encodes the various object features includes: the RNN encodes the various object features in sequence, where one hidden layer vector is obtained in each encoding, and a hidden layer vector obtained in the last encoding is the context representation vector corresponding to the target object sequence.

Further, the step that the decoder outputs the reranking of the various target objects in the target object sequence based on the context representation vector includes: for a current decoded position, a first decoded vector is obtained by decoding based on a context representation vector at the current decoded position; a weight of the hidden layer vector obtained in each encoding to the context representation vector is respectively computed by using an attention mechanism, the hidden layer vector obtained in each encoding is weighted and combined based on the corresponding weight, and an updated hidden layer vector is obtained by superimposing the combined result to the first decoded vector; and the probability of the various target objects is determined by using the softmax function based on the decoded updated hidden layer vector, and a target object corresponding to the current position is decoded based on a maximum value of the probability.

In a second aspect, an apparatus for showing a target object sequence to a target user is provided, and the apparatus includes: a first ranking unit, configured to determine the initial ranking of various target objects in a target object sequence to be shown, where the initial ranking is performed in descending order of correlation degrees between the various target objects and the target user; an acquisition unit, configured to obtain object features respectively corresponding to the various target objects in the target object sequence; a second ranking unit, configured to input, based on the initial ranking, the object features respectively corresponding to the various target objects into a pre-trained reranking model, where the reranking model includes an encoder and a decoder, the encoder encodes the various object features to obtain a context representation vector corresponding to the target object sequence, and the decoder outputs the reranking of the various target objects in the target object sequence based on the context representation vector; and a displaying unit, configured to show the target object sequence to the target user based on positions of the reranked various target objects obtained by the second ranking unit.

In a third aspect, a computer readable storage medium is provided, and the computer readable storage medium stores a computer program that, when executed in a computer, enables the computer to implement the method in the first aspect.

In a fourth aspect, a computing device is provided, and the computing device includes a memory and a processor. The memory stores an executable code; when the processor executes the executable code, the method in the first aspect is implemented.

Through the methods and apparatuses provided by the embodiments of the present specification, first, the initial ranking of the various target objects in the target object sequence to be shown is determined, where the initial ranking is performed in descending order of correlation degrees between the various target objects and the target user; then, the object features respectively corresponding to the various target objects in the target object sequence are obtained; next, the object features respectively corresponding to the various target objects are input, based on the initial ranking, into the pre-trained reranking model, where the reranking model includes the encoder and the decoder, the encoder encodes the various object features to obtain a context representation vector corresponding to the target object sequence, and the decoder outputs the reranking of the various target objects in the target object sequence based on the context representation vector; and finally, the target object sequence is shown to the target user based on the positions of the reranked various target objects. It can be seen from the previous content that in the embodiments of the present specification, after the initial ranking is obtained, the target object sequence is not directly shown to the target user based on the positions of the various target objects in the initial ranking, but the various target objects are reranked by using the reranking model based on the initial ranking. The reranking model ranks the various target objects more reasonably by considering the influence among the various target objects, which can reasonably range the target objects to maximize the user feedback when showing the target object sequence to the target user based on the ranking.

BRIEF DESCRIPTION OF DRAWINGS

To describe the technical solutions in the implementations of the present disclosure more clearly, the following briefly describes the accompanying drawings needed for describing the implementations. Clearly, the accompanying drawings in the following description show merely some implementations of the present disclosure, and a person of ordinary skill in the art can still derive other drawings from these accompanying drawings without creative efforts.

DESCRIPTION OF EMBODIMENTS

The following describes the solutions provided in the present specification with reference to the accompanying drawings.

Figure 1:
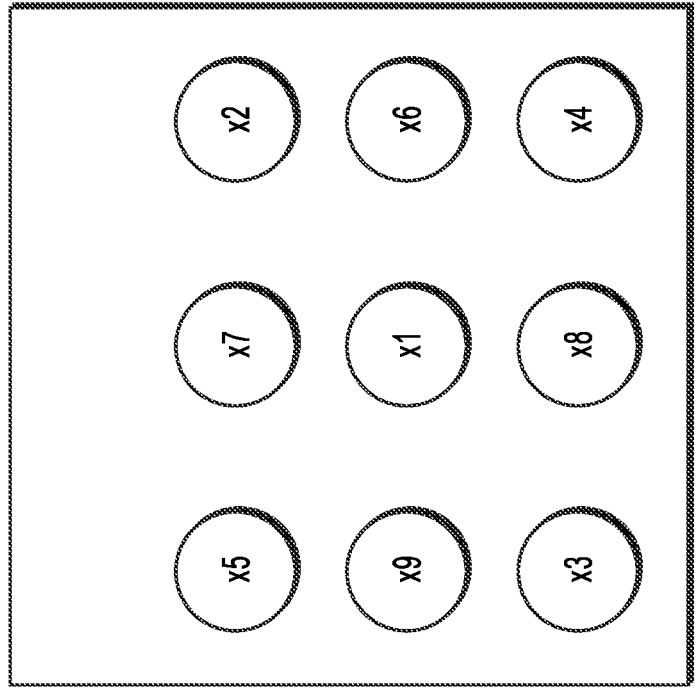
FIG. 1 is a schematic diagram illustrating an example of an implementation scenario, according to some embodiments disclosed by the present specification.
Figure 1:
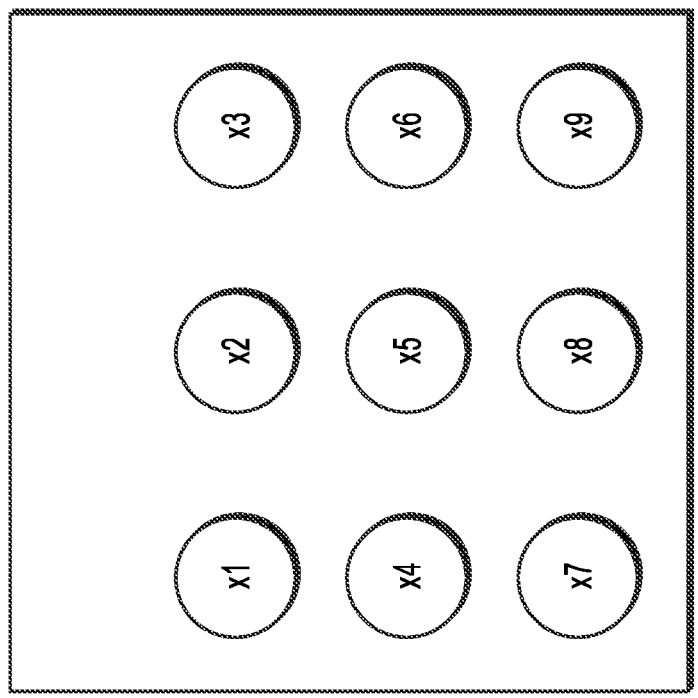

FIG. 1 is a schematic diagram illustrating an example of implementation scenario, according to some embodiments disclosed by the present specification. The implementation scenario involves showing a target object sequence to a target user. It can be understood that the target object sequence includes multiple target objects. The multiple target objects are simultaneously shown to the target user. The multiple target objects have a relative position relationship. Positions of the shown target objects can be determined based on the ranking of the target objects. In the embodiments of the present specification, first, the initial ranking of various target objects in a target object sequence to be shown is determined, where the initial ranking is performed in descending order of correlation degrees between the various target objects and the target user; and then, the various target objects are reranked based on the initial ranking. The various target objects are reranked more reasonably by considering the influence among the various target objects in the reranking, which can reasonably range the target objects to maximize the user feedback when showing the target object sequence to the target user based on the ranking.

A typical implementation scenario is a product recommendation scenario, and the target objects are recommended products. Product material libraries of modern recommendation systems are getting increasingly bigger. In order to achieve the balance between engineering and a recommendation effect, a recommendation process is generally divided into multiple stages, for example, including the stages of recalling, rough ranking, fine ranking, etc. The overall process is like funnel filtration, and refines ranking results step by step. In the recalling stage, a set of a plurality of products that a user may be interested in is found by generally matching a user profile with product labels. In the rough ranking stage, the set of products is ranked by using a small-scale model to find the products that the user is relatively more interested in, so as to hand the products that the user is relatively more interested in to a fine ranking model in the next step. The fine ranking model finely describes the preference of the user to the products by considering rich multi-dimensional features of the products, a multi-dimensional static feature of the user, and various behavior sequences of the user. A result of the fine ranking model is relatively good. Previously, fine ranking results of many recommendation systems were directly shown to users. However, the fine ranking model generally only considers a correlation degree between a single product and the user, and does not consider the influence on the user caused by showing multiple products together. In the embodiments of the present specification, reranking of various products can be obtained through a reranking stage of a recommendation system after initial ranking of the various products is obtained. User feedback is maximized under the conditions of comprehensively considering the explicit preference of a user to attributes, such as a price, a color, and a type, of the product, and the implicit preference of the user to the product ranking, for example, the click-through rate and conversion rate of the user are increased, or the platform revenue of the recommendation system is improved.

Referring to FIG. 1, the target object sequence includes nine target objects. The nine target objects are ranked in descending order of correlation degrees with the target user, and the obtained initial ranking is x1, x2, x3, x4, x5, x6, x7, x8, and x9 in sequence. The various target objects are reranked based on the initial ranking. The reranking of x5, x7, x2, x9, x1, x6, x3, x8, and x4 in sequence is obtained by considering the influence among the various target objects in the reranking. Practice proves that better user feedback can be achieved by showing the target object sequence based on the reranking compared with that achieved by showing the target object sequence based on the initial ranking.

Figure 2:
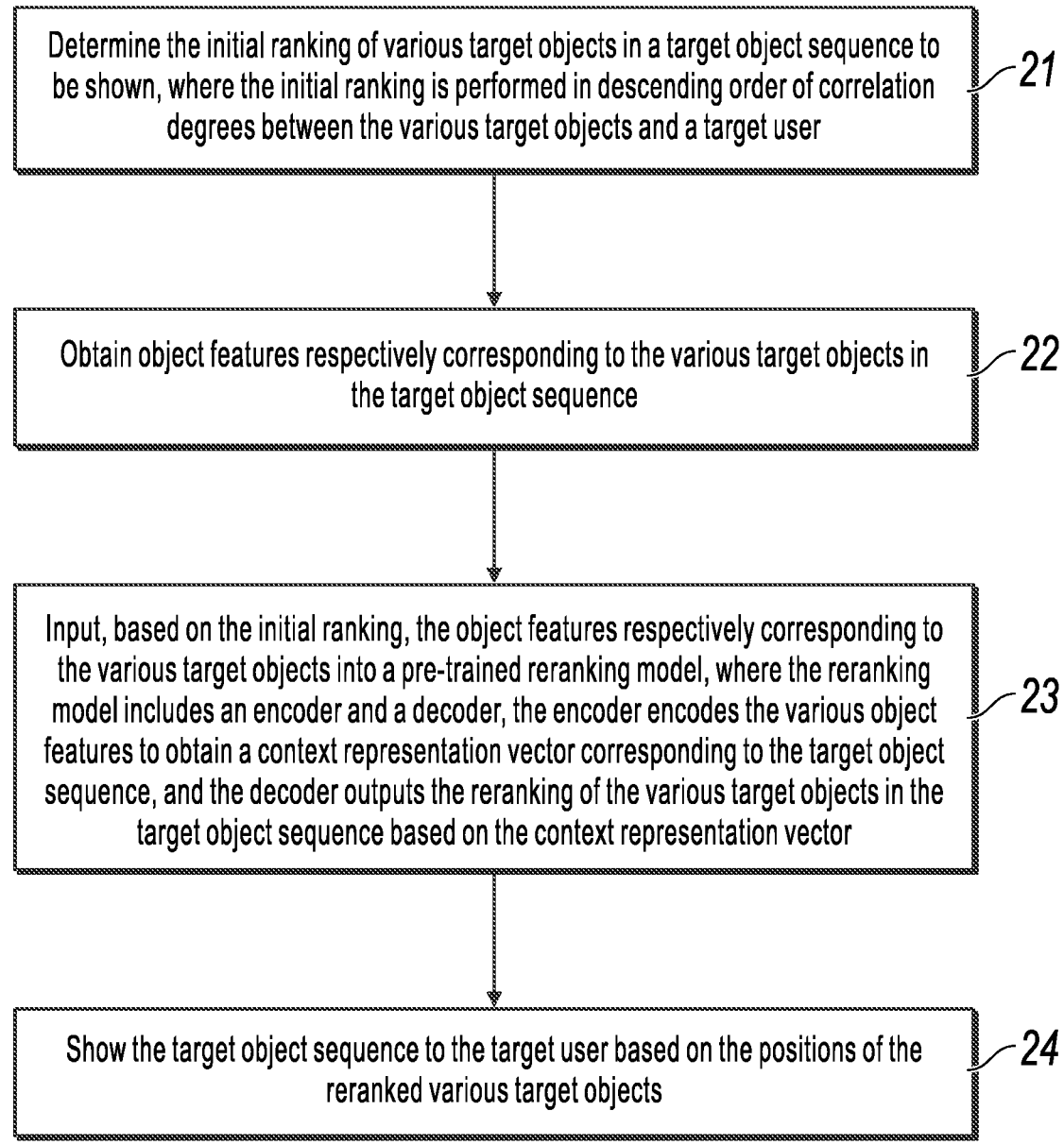
FIG. 2 is a flowchart illustrating an example of a method for showing a target object sequence to a target user, according to some embodiments.

FIG. 2 is a flowchart illustrating an example of a method for showing a target object sequence to a target user, according to some embodiments. The method can be applied to the implementation scenario shown in FIG. 1. As shown in FIG. 2, the method for showing a target object sequence to a target user in the present embodiment includes the following steps: step 21, the initial ranking of various target objects in a target object sequence to be shown is determined, where the initial ranking is performed in descending order of correlation degrees between the various target objects and the target user; step 22, object features respectively corresponding to the various target objects in the target object sequence are obtained; step 23, the object features respectively corresponding to the various target objects are input, based on the initial ranking, into a pre-trained reranking model, where the reranking model includes an encoder and a decoder, the encoder encodes the various object features to obtain a context representation vector corresponding to the target object sequence, and the decoder outputs the reranking of the various target objects in the target object sequence based on the context representation vector; and step 24, the target object sequence is shown to the target user based on positions of the reranked various target objects. Specific execution ways of the previous various steps are described below.

First, at step 21, the initial ranking of the various target objects in the target object sequence to be shown is determined, where the initial ranking is performed in descending order of correlation degrees between the various target objects and the target user. It can be understood that the correlation degrees between the various target objects and the user target are determined respectively when the initial ranking is determined, but the influence on the user caused by showing the various target objects together is not considered.

In the embodiments of the present specification, step 21 can correspond to the previously described fine ranking stage for ranking the products. A specific way for determining the initial ranking is not limited. The initial ranking can be obtained by using a common method for determining correlation degrees between various target objects and a target user.

Then, at step 22, the object features respectively corresponding to the various target objects in the target object sequence are obtained. It can be understood that the object features can include multiple types of features.

In one example, the step that the object features respectively corresponding to the various target objects in the target object sequence are obtained includes:

attribute features respectively corresponding to the various target objects in the target object sequence are obtained;

the correlation degrees between the various target objects and the target user are obtained;

a user feature of the target user is obtained; and an object feature corresponding to any target object is formed by combining an attribute feature of the target object, a correlation degree between the target object and the target user, and the user feature of the target user.

It can be understood that the object features not only include the attribute feature of the target object itself, but also include the user feature of the target user. Taking the target objects being products as an example, the previously described attribute feature can include but is not limited to a price, a color, a type, etc. of the product, and the previously described user feature can include but not is limited to an age, gender, education background, etc. of a user. The previously described correlation degrees can be correlation degrees, determined in the initial ranking, between the various target objects and the target user.

Next, at step 23, the object features respectively corresponding to the various target objects are input, based on the initial ranking, into the pre-trained reranking model, where the reranking model includes the encoder and the decoder, the encoder encodes the various object features to obtain the context representation vector corresponding to the target object sequence, and the decoder outputs the reranking of the various target objects in the target object sequence based on the context representation vector. It can be understood that the object features respectively corresponding to the various target objects are input in sequence, based on the initial ranking, into the pre-trained reranking model, or the object features respectively corresponding to the various target objects are simultaneously input, based on the initial ranking, into the pre-trained reranking model.

In one example, the reranking model is used to predict preference degrees of the target user to the various target objects, and rerank the various target objects based on the predicted preference degrees.

The reranking model is trained based on a sample object sequence; various sample objects in the sample object sequence have the initial ranking; the various sample objects have corresponding object features; the object feature is formed by combining an attribute feature of a sample object, a correlation degree between the sample objects and a sample user, and a user feature of the sample user; and the sample object sequence has a sample label representing the user preference of the sample user to the various sample objects.

Further, the sample label is determined based on historical behavior data of the sample user.

Further, the historical behavior data include at least one of click data or conversion data.

In one example, the encoder is a transformer network. The step that the encoder encodes the various object features includes:

the transformer network encodes the various object features based on a multi-head attention mechanism to obtain the context representation vector corresponding to the target object sequence.

Further, the step that the transformer network encodes the various object features based on a multi-head attention mechanism includes:

query vectors, key vectors, and value vectors respectively corresponding to the various object features are determined;

a weight of a second object feature to a first object feature is determined based on a query vector corresponding to the first object feature and a key vector corresponding to the second object feature, where the first object feature and the second object feature are any two object features in the various object features; and an encoding vector of the first object feature is determined based on weights of the various object features to the first object feature and the value vectors of the various object features, so as to obtain encoding vectors corresponding to the various object features.

Further, the decoder includes a fully connected layer, a regression layer, and an output layer; the step that the decoder outputs the reranking of the various target objects in the target object sequence based on the context representation vector includes:

the fully connected layer processes the context representation vector into a first output vector, where the first output vector has the same number of dimensions as the various target objects;

a softmax function is applied to the first output vector on the regression layer to obtain scores of the various target objects; and the output layer outputs the reranking of the various target objects in the target object sequence based on a descending order of the scores of the various target objects.

Figure 3:
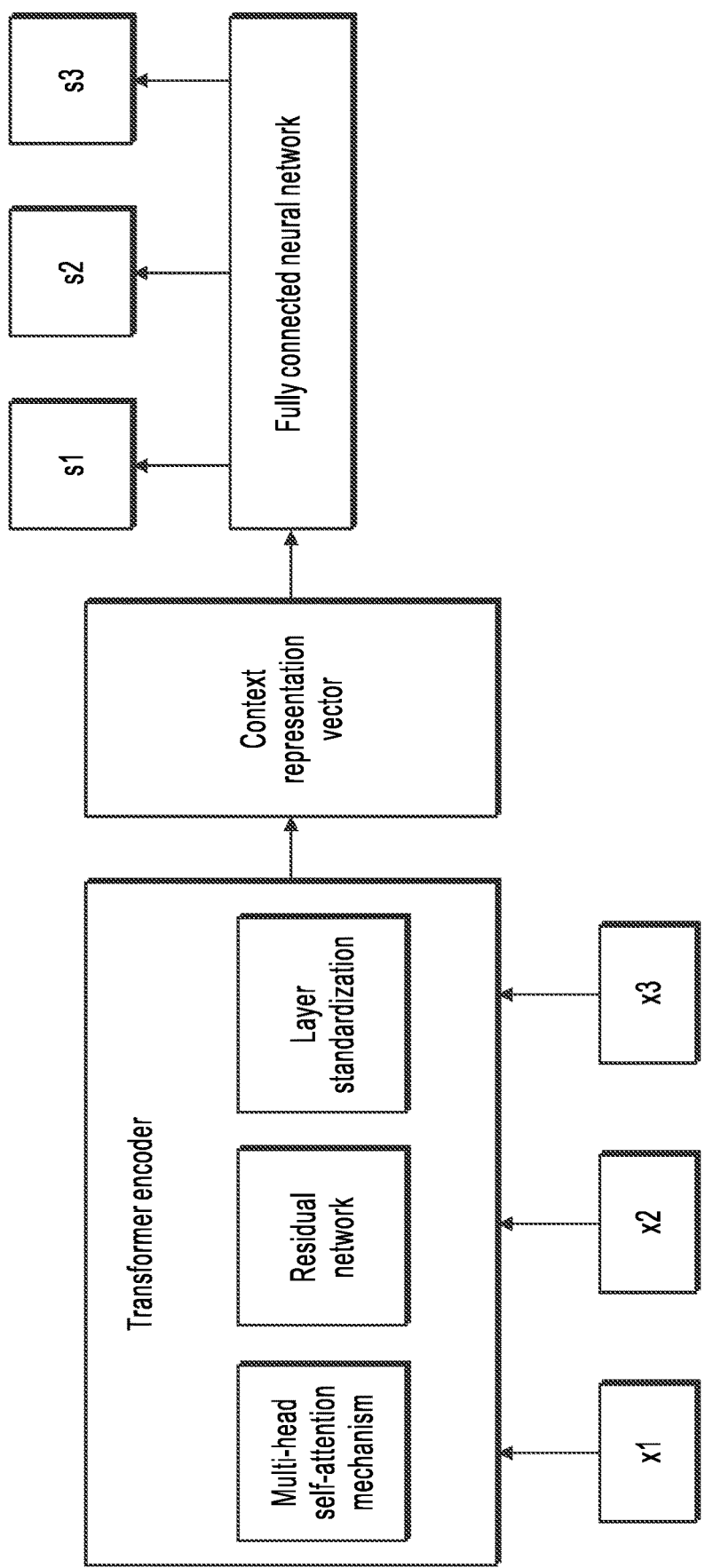
FIG. 3 is a schematic structural diagram illustrating an example of a reranking model, according to some embodiments.

FIG. 3 is a schematic structural diagram illustrating an example of a reranking model, according to some embodiments. The reranking model mainly includes a transformer encoder and a fully connected network. x1, x2, and x3 represent the object features of the various target objects in the target object sequence. It can be understood that the present embodiment is illustrated by taking the target object sequence including three target objects as an example. The transformer encoder encodes the various object features to obtain the context representation vector corresponding to the target object sequence by fully considering the mutual influence among the various object features. Then, a fully connected neural network processes the context representation vector to output scores s1, s2, and s3 of the various target objects. It can be understood that s1 represents the score of the target object corresponding to x1, s2 represents the score of the target object corresponding to x2, and s3 represents the score of the target object corresponding to x3. The reranking of the various target objects in the target object sequence is output in descending order of the scores of the various target objects.

The transformer encoder relies on a multi-head self-attention mechanism, and optimizes a multi-head self-attention network by using a back-propagation algorithm. In order to have more information retention, output of the multi-head self-attention network will be combined with a residual network to output a result to the next step. The residual network performs one-time addition operation on original output of a model and output of the multi-head self-attention network. In order to ensure the stability of the model in a training process and alleviate the problem of gradient exploding caused by too large values, the residual network can be followed by layers of standardized networks to scale results to the same scale to obtain more stable numerical results.

Taking the target objects being products as an example, input of the reranking model also includes position information of each product in addition to a product sequence (including user information). In order to model the influence of relative relationship of positions, the positions are also encoded, and the position codes are input into the model together with other features.

The present embodiment is driven based on data, and a modeling target is consistent with a service target, which realizes an end-to-end solution, and optimizes the service target at the maximum granularity. In addition, the mutual influence of long distances and short distances among the various target objects is modeled, and the influence among the various target objects is implicitly considered. These relationships can be described very well no matter by the influence of the short distances or the influence of the long distances. The end-to-end characteristics are trained based on the neural network model, and related parameters in the attention mechanism are optimized. The transformer uses the self-attention mechanism, so the influence of the long and short distances among the products is fully considered, thereby obtaining a better ranking way.

In another example, the encoder is a recurrent neural network (RNN). The step that the encoder encodes the various object features includes: the RNN encodes the various object features in sequence, where one hidden layer vector is obtained in each encoding, and a hidden layer vector obtained in the last encoding is the context representation vector corresponding to the target object sequence.

Further, the step that the decoder outputs the reranking of the various target objects in the target object sequence based on the context representation vector includes:

for a current decoded position, a first decoded vector is obtained by decoding based on a context representation vector at the current decoded position;

a weight of the hidden layer vector obtained in each of the encodings to the context representation vector is respectively computed by using an attention mechanism, the hidden layer vector obtained in each encoding is weighted and combined based on the corresponding weight, and an updated hidden layer vector is obtained by superimposing the combined result to the first decoded vector; and the probability of the various target objects is determined by using the softmax function based on the decoded updated hidden layer vector, and a target object corresponding to the current position is decoded based on a maximum value of the probability.

Figure 4:
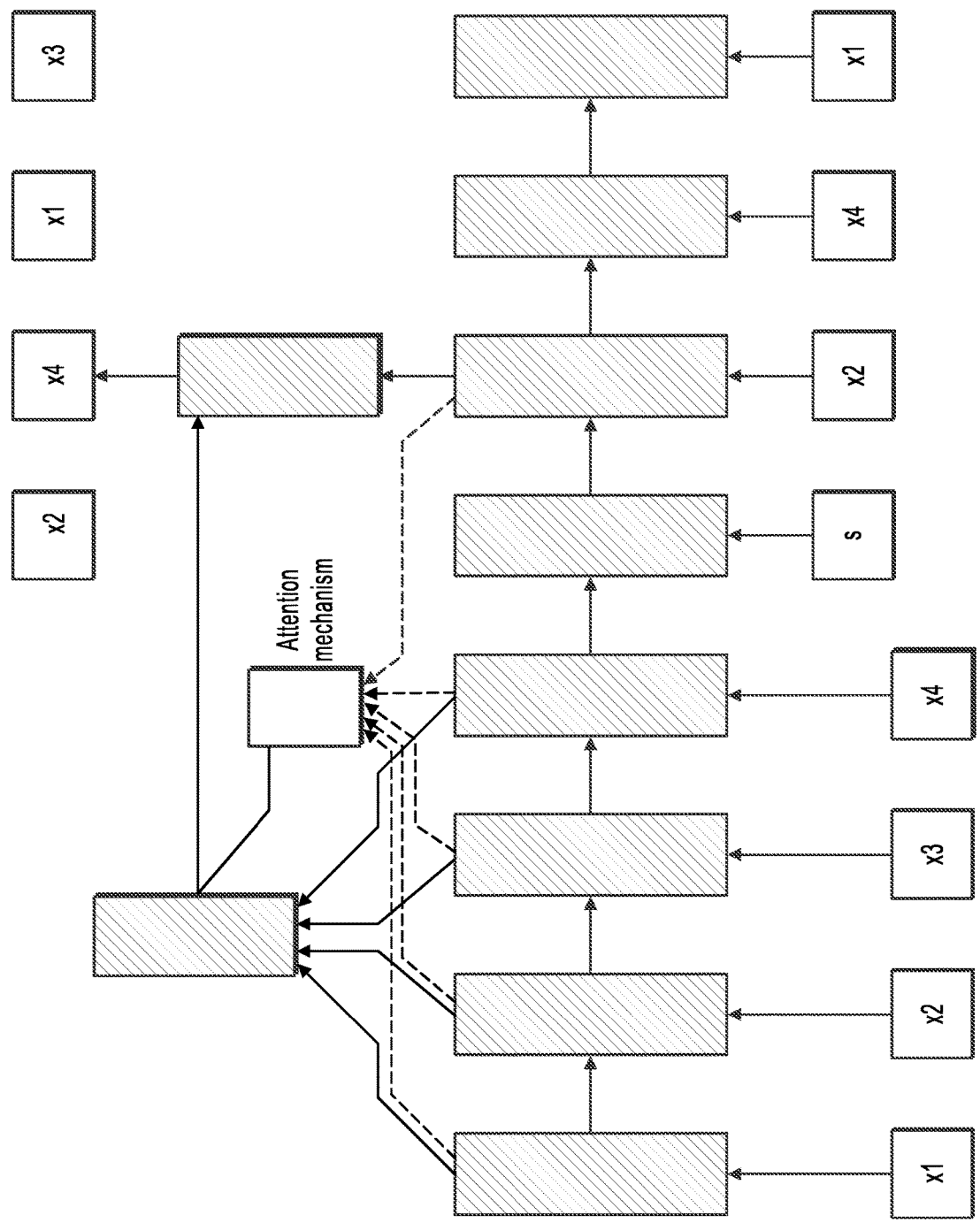
FIG. 4 is a schematic structural diagram illustrating an example of a reranking model, according to some other embodiments.

FIG. 4 is a schematic structural diagram illustrating an example of a reranking model, according to some other embodiments. The reranking model applies an advanced pointer network framework in natural language processing to recommendation ranking. First, the target objects that are ranked initially are input into the RNN for encoding to obtain a context representation vector corresponding to an overall sequence. Then, an optimal target object in one input sequence is selected, step by step, to output in combination with a simplified attention mechanism. Here, the mutual influence among the various target objects is fully considered due to the existence of the attention mechanism in each decoding. Referring to FIG. 4, the initial ranking of the various target objects is x1, x2, x3, and x4, where s represents initial input of a decoded part. The reranking obtained through the reranking model is x2, x4, x1, and x3.

Deformation networks of RNN, such as a long short-term memory (LSTM) network or a gated recurrent unit (GRU) network, can also be introduced to replace the RNN.

In the present embodiment, the mode of inversely ranking the scores is replaced by directly outputting the reranked target object sequence instead of the scores of the various target objects. An end-to-end solution is used to model the data shown at a time as a whole. Through continuous iterative optimization of the model, the reranked target object sequence is directly output to ensure that the final result is an optimal showing result. The mutual influence of various dimensions of the object features of the target objects of a context is fully considered by using the attention mechanism in the neural network, and the interaction among the various target objects can be fully understood by training the reranking model, so that the final ranking result is more reasonable.

Finally, at step 24, the target object sequence is shown to the target user based on the positions of the reranked various target objects. It can be understood that the positions are specifically ranking positions. When the target object sequence is shown, the corresponding shown positions can have a predetermined mapping relationship with the ranking positions.

For example, referring to the implementation scenario shown in FIG. 1, various shown positions can be numbered in sequence from top to bottom and from left to right. For example, the numbers are 1 to 9. The various reranked target objects can be corresponded to the shown positions of the various numbers in sequence based on a reranked order.

Through the method provided by the embodiments of the present specification, first, the initial ranking of the various target objects in the target object sequence to be shown is determined, where the initial ranking is performed in descending order of correlation degrees between the various target objects and the target user; then, the object features respectively corresponding to the various target objects in the target object sequence are obtained; next, the object features respectively corresponding to the various target objects are input, based on the initial ranking, into the pre-trained reranking model, where the reranking model includes the encoder and the decoder, the encoder encodes the various object features to obtain the context representation vector corresponding to the target object sequence, and the decoder outputs the reranking of the various target objects in the target object sequence based on the context representation vector; and finally, the target object sequence is shown to the target user based on the positions of the reranked various target objects. It can be seen from the previous content that in the embodiments of the present specification, after the initial ranking is obtained, the target object sequence is not directly shown to the target user based on the positions of the various target objects in the initial ranking, but the various target objects are reranked by using the reranking model based on the initial ranking. The reranking model ranks the various target objects more reasonably by considering the influence among the various target objects, which can reasonably range the target objects to maximize the user feedback when showing the target object sequence to the target user based on the ranking.

Figure 5:
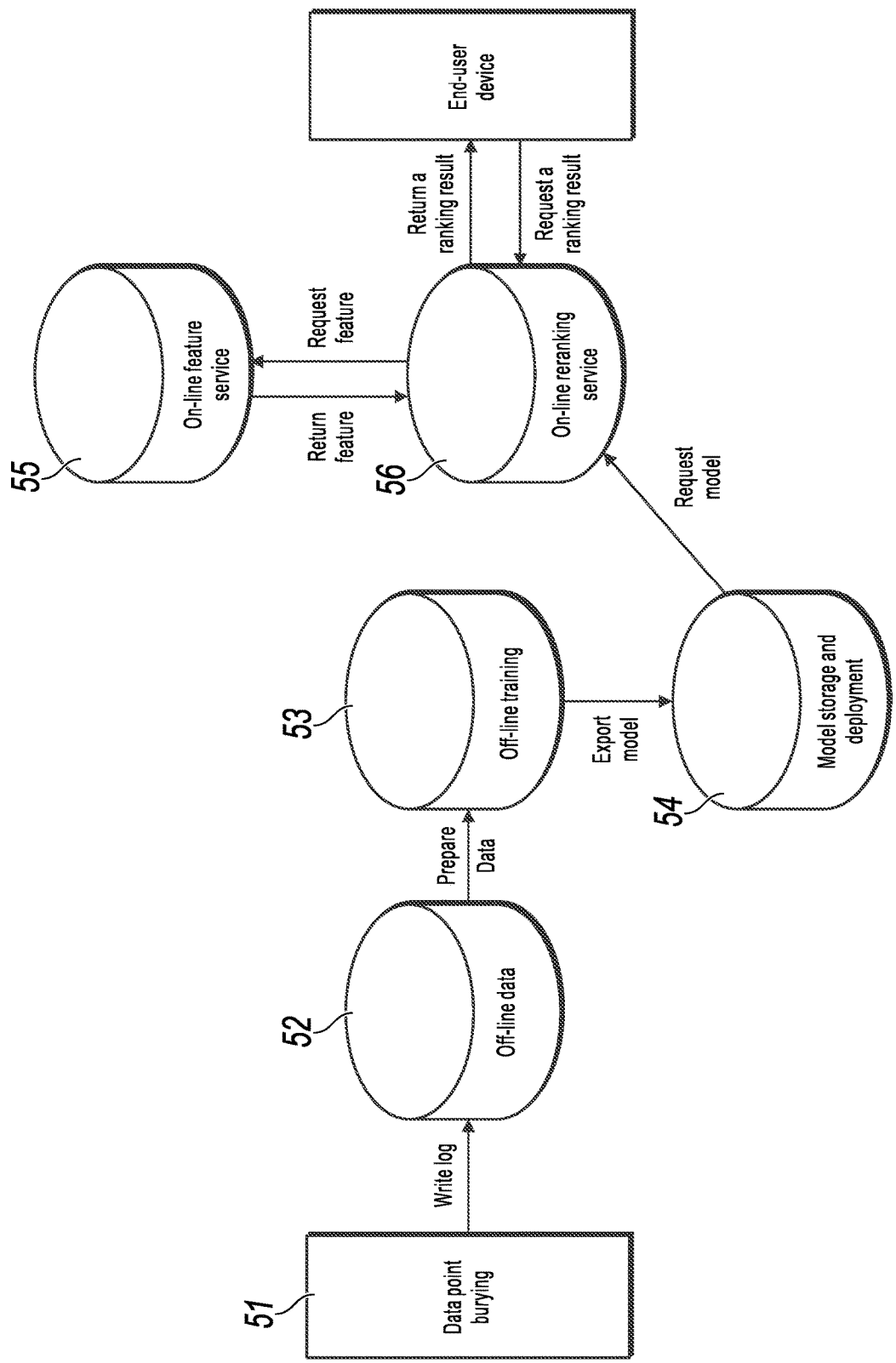
FIG. 5 is a schematic structural diagram illustrating an example of a reranking system, according to some embodiments.

FIG. 5 is a schematic structural diagram illustrating an example of a reranking system, according to some embodiments. Referring to FIG. 5, the reranking system includes a data point burying module 51, an off-line data module 52, an off-line training module 53, a model storage and deployment module 54, an on-line feature service module 55, and an on-line reranking service module 56. The following is described by taking target objects being products as an example.

The data point burying module 51 is mainly configured to: collect the exposure, click, conversion, and other historical behavior data of a user from a client device and transmit these historical behavior data to a server via a network for the off-line data module 52 to use. Point burying, also known as dotting, is to collect data with the help of codes of buried points. A segment of codes is added to the place where user behavior data need to be monitored, and related data are collected to the server by burying a determined point at the client device. The data point burying module is the most basic module in the whole system, and is configured to collect the historical data of the user, and subsequently guide the system to better recommend target objects to the user by using a data-driven method based on historical feedback data of the user to the target objects. During point burying, the system needs to capture a target object sequence exposed by the user, expose a position of each target object, and collect a behavior sequence of clicking the target object by the user or a behavior sequence of transforming the target object, other behavior sequences of the user, and etc. When the system has more comprehensive user data, the system can profile the user preference more precisely, so as to better meet the needs of the user.

The off-line data module 52 is mainly configured to: sort data related to the target objects and data related to the user, and process the data into a specific input format of a reranking model. The data need to be stored after sorting, so as to provide raw materials for training the reranking model subsequently. In the present solution, multiple target objects are placed into the same row of data.

The off-line data include exposure data, click data, and conversion data of the user, static feature data of the user, historical behavior data of the user, and feature data of the products, and finally all the data need to be spliced. Each row is an exposure sequence of a certain user, and correspondingly includes information such as the static feature data of the user, the historical behavior data of the user, feature sequences of the products, click sequence labels of the products, conversion sequence labels of the products, and related sequence lengths. In addition, in order to fully use fine ranking information, a fine ranking score sequence can further be input into each row. It can be understood that the fine ranking sequence includes the scores of various products, namely, the correlation degrees between the user and the various products.

Each piece of exposure data has a trace identifier (ID), and the products exposed at the same time can be connected in series through the trace ID. The exposure and the click can also be spliced through the trace ID. Usually, the last exposure data are connected to the conversion data in series, and the exposure data and the conversion data can be spliced through the user and the products.

The user and the products have many discrete features, for example, what category does the products belong to, what discrete attributes does the user have, etc. In order to input the off-line feature data into a neural network model, the discrete features need to be subjected to ID processing. Specifically, various discrete values are enumerated into a table, and then the occurrence frequency of various enumerated values is counted. The enumerated values with the occurrence frequency less than a threshold value are removed from the table, then the results in the table are numbered from 0. Each number corresponds to one enumerated value, and the ID processing is completed to form a feature identification table. Then, all of the processed data are replaced with numbers.

The data need to be checked to ensure that the data input into the model are correct after the data sorting is completed. Usually, whether the whole data are missing or redundant after processing can be determined by using some macro statistical values. In addition, the data can also be checked in a way of sampling.

The off-line data are finally divided into three parts. The first part is a training table, used to train the model and update parameters. The second part is an off-line evaluation table, used to evaluate a model effect off-line. The third part is a feature table, used to query the discrete feature ID and feature embedding.

The training table and the evaluation table are in the same form. Each row represents a complete exposure sequence. Each row includes complete features of the user and complete features of each product. In addition, each row further has information of each label based on service needs. In order to facilitate the use of the model, each row is further added with a length of a product sequence and a position of each product.

Each row of the feature table is a combination of one feature ID and a feature value. Meanwhile, in order to mark different feature types, one field of a feature type is provided. In order to construct grouping features, the last column further records which group the features belong to. In addition to the original features, the feature data may further include artificial cross features.

The off-line training module 53 is mainly configured to: construct a reranking model, for example, construct a transformer model, and simultaneously consider, by using a data driven method, correlation degrees between the products and the user and the interaction among the products to produce a generalized model, so as to guide the on-line reranking model to produce a ranking result and submit the ranking result to the user.

Training mode: Because the lengths of the input product sequences may be different, to facilitate training, a maximum sequence length is set, and the sequences less than this length are uniformly supplemented to this length. The supplemented products should not play a role in a model training process, so a mask is needed in the model to set all inputs involved in the subsequently supplemented products to be 0. Meanwhile, considering the problem of different lengths in a prediction mode, a new network is constructed for the prediction mode here when the structure of the model is designed, but the prediction mode shares parameters with the training mode. A cross entropy function is used in a model loss function. The cross entropy loss is computed by using the scores of the various products and the labels of the various products (for example, click or conversion). The model is optimized by using a combined method of mini-batch stochastic gradient descent (mini-batch SGD) optimization and momentum.

Prediction mode: the prediction mode shares the same set of parameters with the training mode, but the input length is not limited by a fixed length. In order to verify an effect of the model before an on-line service is started, the estimation table processed by the off-line data module 52 is computed through the model in the prediction mode, so as to obtain a new product ranking result. Then, common indicators in the recommendation ranking are computed to obtain a general effect of the model to guide subsequent improvement of the model.

When the reranking model uses a pointer network framework, the module constructs a reranking model from massive off-line data and determines the preference of the user to the products and the mutual influence among the products to obtain a generalized model to act on a subsequent on-line service module, and finally provide a ranking result to the user.

In the training mode, the model inputs the feature data, and computes until the step before decoding, to obtain a context representation vector. From decoding, the model obtains a new decoded hidden layer vector based on the attention mechanism, and obtains the probability of the various products in a sequence by using a softmax function. In the solution, the loss predicted by the current model is computed by using the cross entropy function. A decoding result of a previous step will be used when the loss of the decoding of the next step is computed every time. In order to alleviate the problem of repeated decoding, if a certain product has been decoded in the previous step, the decoding probability here will be subtracted by a large number, thereby reducing the decoding probability to 0. The final loss function is to add up all loss of each step. The model is optimized by using the combined method of common stochastic gradient descent optimization and momentum.

The prediction mode uses the network parameters that are finally optimized by the training mode. Generally similar to the training in the training mode, a trained model needs to be imported, then the feature data are input, and the whole decoding process is completed; and then various products need to be decoded and output in sequence in combination with the attention mechanism in a decoding process. In order to verify the effectiveness of the model, the predicted results need to be stored off-line to compute some common indicators in the recommended ranking. These indicators also guide the tuning of the model from the side. The model needs to be stored and deployed to a specific position after being prepared, for subsequent on-line service to use.

The model storage and deployment module 54 is mainly configured to: connect off-line training and on-line service, save the model produced by off-line training, and then deploy the model to a distributed cluster for subsequent ranking service to use.

Model storage is divided into two stages. The first stage is to continuously export, in an off-line training process, better models based on the improvements of the indicators estimated off-line, and store the models in a temporary path that can be changed. The second stage is to export the last optimal model estimated off-line to a specific address. In order to ensure the stability of on-line service, this address needs high permission and cannot be changed easily.

The process of deploying the model to the distributed cluster is a process of pulling the stored model to an on-line distributed server. In order to ensure on-line service quality, the model needs to be tested in detail after being deployed to the server. Normal results returned by a service are ensured by constructing some simple requests, including a single piece of data and a plurality of data.

The on-line feature service module 55 is mainly configured to obtain sources of data in an on-line service stage, where the data include the user features and the product features. The on-line feature service is special in two aspects. Firstly, the features of the user and the products may change over time, so corresponding data will be updated more frequently; and secondly, in order to meet user experience better, the response time of a request of an on-line service model should be as short as possible. In a word, the module requires very high real-time performance. In addition, the on-line feature service will further perform some feature transformation: because the input of the neural network model can only be numerical data, a feature platform should identify a corresponding feature ID in the feature table based on a real feature, and then input the corresponding feature ID into the model. In addition, in order to improve the effect of the model, some artificial cross features are usually constructed, and the feature service platform further needs to construct cross features based on the original features.

The on-line reranking service module 56 is mainly configured to receive an upstream ranking result, obtain a better permutation and combination through a computation of the model, and return the result to an end-user device. The module will be directly responsible for user experience, and as a core module, the on-line reranking service module is in close connection with other modules. When the user sends a request to the recommendation system, the module will be started to be requested after a series of recalling and fine ranking. The model of the module comes from the model deployed by the model storage and deployment module 54 after off-line training. The system will load the model into a memory. Next, the system will request the on-line service module 55 to obtain input data of the model. Then, the reranking model obtains high-quality permutation output through a computation, and returns the high-quality permutation output to the end-user device. Because the model considers the mutual influence among the products, the model request is a one-time request for one exposure sequence, and a permutation result is directly obtained. Compared with the conventional mode of a one-time request for one product, the present solution has the advantages of saving computing resources and accelerating model response.

Figure 6:
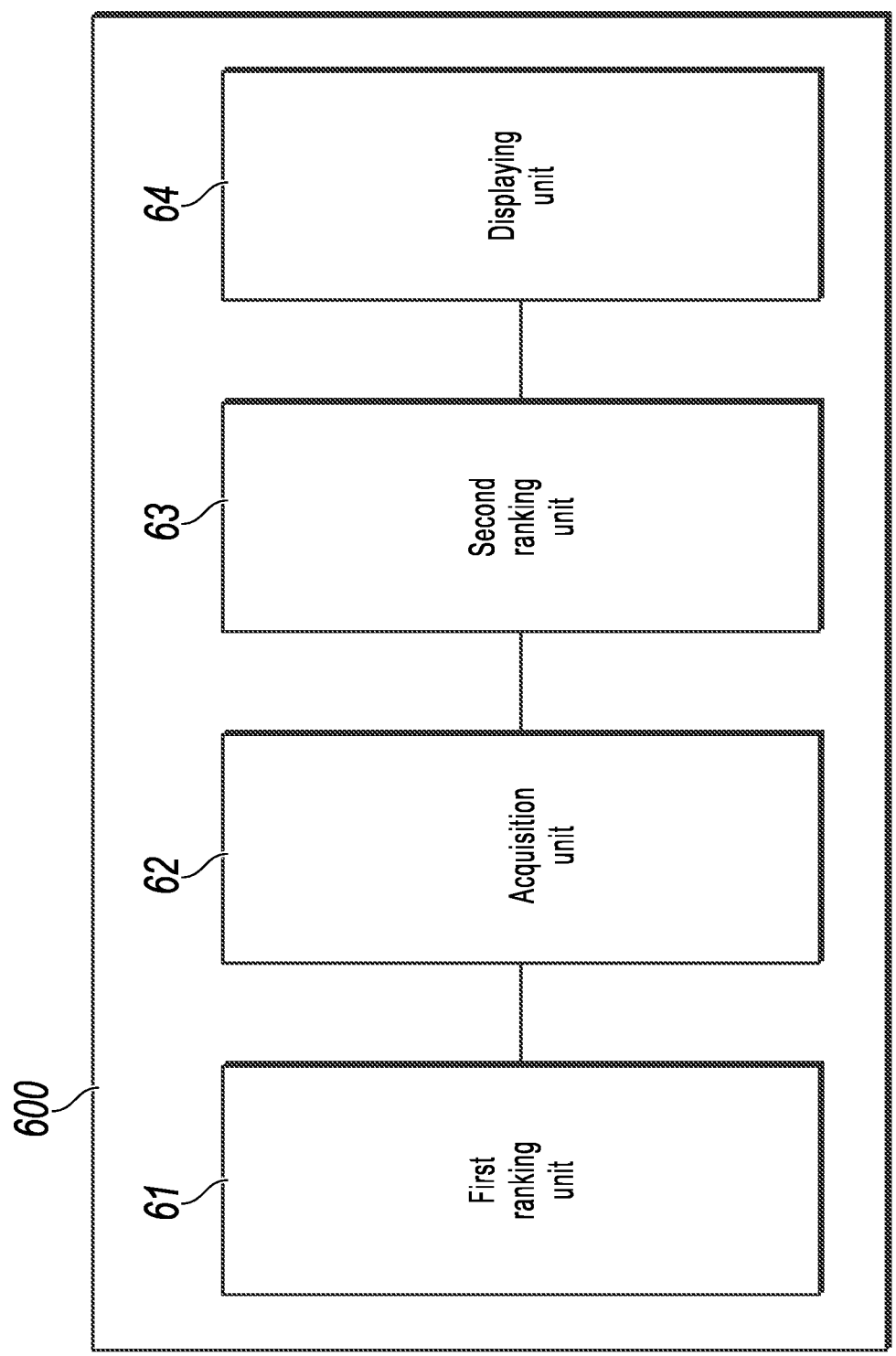
FIG. 6 is a schematic block diagram illustrating an example of an apparatus for showing a target object sequence to a target user, according to some embodiments.

According to the embodiments in another aspect, an apparatus for showing a target object sequence to a target user is further provided. The apparatus is configured to perform the method for showing a target object sequence to a target user provided by the embodiments of the present specification. FIG. 6 is a schematic block diagram illustrating an example of an apparatus for showing a target object sequence to a target user, according to some embodiments. As shown in FIG. 6, the apparatus 600 includes:

a first ranking unit 61, configured to determine the initial ranking of various target objects in a target object sequence to be shown, where the initial ranking is performed in descending order of correlation degrees between the various target objects and the target user;

an acquisition unit 62, configured to obtain object features respectively corresponding to various target objects;

a second ranking unit 63, configured to input, based on the initial ranking determined by the first ranking unit 61, the object features, obtained by the acquisition unit 62, respectively corresponding to the various target objects into a pre-trained reranking model, where the reranking model includes an encoder and a decoder, the encoder encodes the various object features to obtain a context representation vector corresponding to the target object sequence, and the decoder outputs the reranking of the various target objects in the target object sequence based on the context representation vector; and a displaying unit 64, configured to show the target object sequence to the target user based on positions of the reranked various target objects obtained by the second ranking unit 63.

Optionally, as an embodiment, the acquisition unit 62 includes:

a first acquisition subunit, configured to obtain attribute features respectively corresponding to the various target objects in the target object sequence;

a second acquisition subunit, configured to obtain correlation degrees between the various target objects and the target user;

a third acquisition subunit, configured to obtain a user feature of the target user; and a combination subunit, configured to combine an attribute feature of any target object obtained by the first acquisition subunit, a correlation degree between the target object and the target user obtained by the second acquisition subunit, and the user feature of the target user obtained by the third acquisition subunit into an object feature corresponding to the target object.

Further, the reranking model is used to predict preference degrees of the target user to the various target objects, and rerank the various target objects based on the predicted preference degrees;

the reranking model is trained based on a sample object sequence; various sample objects in the sample object sequence have the initial ranking; the various sample objects have corresponding object features; the object feature is formed by combining an attribute feature of a sample objects, a correlation degree between the sample objects and a sample user, and a user feature of the sample user; and the sample object sequence has a sample label representing the user preference of the sample user to the various sample objects.

Further, the sample label is determined based on historical behavior data of the sample user.

Further, the historical behavior data include at least one of click data or conversion data.

Optionally, as an embodiment, the encoder is a transformer network. The step that the encoder encodes the various object features includes:

the transformer network encodes the various object features based on a multi-head attention mechanism, to obtain the context representation vector corresponding to the target object sequence.

Further, the step that the transformer network encodes the various object features based on a multi-head attention mechanism includes:

query vectors, key vectors, and value vectors respectively corresponding to the various object features are determined;

a weight of a second object feature to a first object feature is determined based on a query vector corresponding to the first object feature and a key vector corresponding to the second object feature, where the first object feature and the second object feature are any two object features in the various object features; and an encoding vector of the first object feature is determined based on weights of the various object features to the first object feature and the value vectors of the various object features, so as to obtain encoding vectors corresponding to the various object features.

Further, the decoder includes a fully connected layer, a regression layer, and an output layer; the step that the decoder outputs the reranking of the various target objects in the target object sequence based on the context representation vector includes:

the fully connected layer processes the context representation vector into a first output vector, where the first output vector has the same number of dimensions as the various target objects;

a softmax function is applied to the first output vector on the regression layer to obtain scores of the various target objects; and the output layer outputs the reranking of the various target objects in the target object sequence based on a descending order of the scores of the various target objects.

Optionally, as an embodiment, the encoder is an RNN;

the step that the encoder encodes the various object features includes:

the RNN encodes the various object features in sequence, where one hidden layer vector is obtained in each encoding, and a hidden layer vector obtained in the last encoding is the context representation vector corresponding to the target object sequence.

Further, the step that the decoder outputs the reranking of the various target objects in the target object sequence based on the context representation vector includes:

for a current decoded position, a first decoded vector is obtained by decoding based on a context representation vector at the current decoded position;

a weight of the hidden layer vector obtained in each encoding to the context representation vector is respectively computed by using an attention mechanism, the hidden layer vector obtained in each encoding is weighted and combined based on the corresponding weight, and an updated hidden layer vector is obtained by superimposing the combined result to the first decoded vector; and the probability of the various target objects is determined by using the softmax function based on the decoded updated hidden layer vector, and a target object corresponding to the current position is decoded based on a maximum value of the probability.

According to an implementation of another aspect, a computer readable storage medium is further provided, on which a computer program is stored. When the computer program is executed in a computer, the computer is caused to perform the method described with reference to FIG. 2.

According to an implementation of still another aspect, a computing device is further provided and includes a memory and a processor. Executable code is stored in the memory, and when executing the executable code, the processor implements the method with reference to FIG. 2.

A person skilled in the art should be aware that in the previous one or more examples, functions described in the present disclosure can be implemented by hardware, software, firmware, or any combination thereof. When the present disclosure is implemented by software, the functions can be stored in a computer readable medium or transmitted as one or more instructions or codes in the computer readable medium.

The objectives, technical solutions, and benefits of the present disclosure are further described in detail in the previously described specific implementations. It should be understood that the previously described descriptions are merely specific implementations of the present disclosure, but are not intended to limit the protection scope of the present disclosure. Any modification, equivalent replacement, or improvement made based on the technical solutions of the present disclosure shall fall within the protection scope of the present disclosure.

What is claimed is:

1. A computer-implemented method, comprising:
   determining an initial ranking of a plurality of target objects in a target object sequence, wherein the initial ranking is performed in descending order based on correlation degrees between the plurality of target objects and a target user;
   obtaining a plurality of object features respectively corresponding to the plurality of target objects in the target object sequence;
   inputting, based on the initial ranking, the plurality of object features into a reranking model, wherein the reranking model comprises an encoder and a decoder;
   encoding the plurality of object features using the encoder to obtain a context representation vector corresponding to the target object sequence;
   obtaining a reranking of the plurality of target objects in the target object sequence based on the context representation vector using the decoder, wherein obtaining the reranking of the plurality of target objects comprises:
      processing the context representation vector into a first output vector, wherein the first output vector has a same number of dimensions as the plurality of target objects;
      applying a softmax function to the first output vector to obtain scores of the plurality of target objects; and
      outputting the reranking of the plurality of target objects in the target object sequence based on a descending order of the scores of the plurality of target objects; and
   displaying the target object sequence to the target user based on the reranking of the plurality of target objects.

2. The computer-implemented method according to claim 1, wherein obtaining the plurality of object features respectively corresponding to the plurality of target objects in the target object sequence comprises:
   obtaining attribute features respectively corresponding to the plurality of target objects in the target object sequence;
   obtaining the correlation degrees between the plurality of target objects and the target user;
   obtaining a user feature of the target user; and
   determining, for each target of the plurality of target objects, an object feature of the target object based on an attribute feature corresponding to the target object, a correlation degree between the target object and the target user, and the user feature of the target user.

3. The computer-implemented method according to claim 2, wherein the reranking model is configured to predict preference degrees of the target user with respect to the plurality of target objects, and rerank the plurality of target objects based on the preference degrees;

wherein the reranking model is trained based on a sample object sequence, wherein a plurality of sample objects in the sample object sequence are arranged based on the initial ranking, wherein the plurality of sample objects have corresponding object features, wherein each object feature corresponding to a sample object is determined based on an attribute feature of the sample object, a correlation degree between the sample object and a sample user, and a user feature of the sample user, and wherein the sample object sequence has a sample label representing a user preference of the sample user with respect to each object of the plurality of sample objects.

4. The computer-implemented method according to claim 3, wherein the sample label is determined based on historical behavior data of the sample user, and wherein the historical behavior data comprise at least one of click data or conversion data.

5. The computer-implemented method according to claim 1, wherein the encoder comprises a transformer network, and wherein encoding the plurality of object features using the encoder to obtain the context representation vector corresponding to the target object sequence comprises:
encoding the plurality of object features using the transformer network based on a multi-head attention mechanism to obtain the context representation vector corresponding to the target object sequence.

6. The computer-implemented method according to claim 5, wherein encoding the plurality of object features using the transformer network based on the multi-head attention mechanism comprises:
determining query vectors, key vectors, and value vectors corresponding to the plurality of object features;
determining a weight of a second object feature with respect to a first object feature based on a query vector corresponding to the first object feature and a key vector corresponding to the second object feature, wherein the first object feature and the second object feature comprise any two object features of the plurality of object features; and
determining, based on weights of the plurality of object features with respect to the first object feature and the value vectors of the plurality of object features, an encoding vector of the first object feature to obtain encoding vectors corresponding to the plurality of object features.

7. The computer-implemented method according to claim 5, wherein the decoder comprises a fully connected layer, a regression layer, and an output layer, and wherein obtaining the reranking of the plurality of target objects in the target object sequence based on the context representation vector using the decoder comprises:
processing, at the fully connected layer, the context representation vector into the first output vector;
applying the softmax function to the first output vector at the regression layer to obtain the scores of the plurality of target objects; and
outputting, at the output layer, the reranking of the plurality of target objects in the target object sequence based on the descending order of the scores of the plurality of target objects.

8. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
determining an initial ranking of a plurality of target objects in a target object sequence, wherein the initial ranking is performed in descending order based on correlation degrees between the plurality of target objects and a target user;
obtaining a plurality of object features respectively corresponding to the plurality of target objects in the target object sequence;
inputting, based on the initial ranking, the plurality of object features into a reranking model, wherein the reranking model comprises an encoder and a decoder;
encoding the plurality of object features using the encoder to obtain a context representation vector corresponding to the target object sequence;
obtaining a reranking of the plurality of target objects in the target object sequence based on the context representation vector using the decoder, wherein obtaining the reranking of the plurality of target objects comprises:
processing the context representation vector into a first output vector, wherein the first output vector has a same number of dimensions as the plurality of target objects;
applying a softmax function to the first output vector to obtain scores of the plurality of target objects; and
outputting the reranking of the plurality of target objects in the target object sequence based on a descending order of the scores of the plurality of target objects; and
displaying the target object sequence to the target user based on the reranking of the plurality of target objects.

9. The computer-implemented system according to claim 8, wherein obtaining the plurality of object features respectively corresponding to the plurality of target objects in the target object sequence comprises:
obtaining attribute features respectively corresponding to the plurality of target objects in the target object sequence;
obtaining the correlation degrees between the plurality of target objects and the target user;
obtaining a user feature of the target user; and
determining, for each target of the plurality of target objects, an object feature of the target object based on an attribute feature corresponding to the target object, a correlation degree between the target object and the target user, and the user feature of the target user.

10. The computer-implemented system according to claim 9, wherein the reranking model is configured to predict preference degrees of the target user with respect to the plurality of target objects, and rerank the plurality of target objects based on the preference degrees;
wherein the reranking model is trained based on a sample object sequence, wherein a plurality of sample objects in the sample object sequence are arranged based on the initial ranking, wherein the plurality of sample objects have corresponding object features, wherein each object feature corresponding to a sample object is determined based on an attribute feature of the sample object, a correlation degree between the sample object and a sample user, and a user feature of the sample user, and wherein the sample object sequence has a sample label representing a user preference of the sample user with respect to each object of the plurality of sample objects.

11. The computer-implemented system according to claim 10, wherein the sample label is determined based on historical behavior data of the sample user, and wherein the historical behavior data comprise at least one of click data or conversion data.

12. The computer-implemented system according to claim 8, wherein the encoder comprises a transformer network, and wherein encoding the plurality of object features using the encoder to obtain the context representation vector corresponding to the target object sequence comprises:
   encoding the plurality of object features using the transformer network based on a multi-head attention mechanism to obtain the context representation vector corresponding to the target object sequence.

13. The computer-implemented system according to claim 12, wherein encoding the plurality of object features using the transformer network based on the multi-head attention mechanism comprises:
   determining query vectors, key vectors, and value vectors corresponding to the plurality of object features;
   determining a weight of a second object feature with respect to a first object feature based on a query vector corresponding to the first object feature and a key vector corresponding to the second object feature, wherein the first object feature and the second object feature comprise any two object features of the plurality of object features; and
   determining, based on weights of the plurality of object features with respect to the first object feature and the value vectors of the plurality of object features, an encoding vector of the first object feature to obtain encoding vectors corresponding to the plurality of object features.

14. The computer-implemented system according to claim 12, wherein the decoder comprises a fully connected layer, a regression layer, and an output layer, and wherein obtaining the reranking of the plurality of target objects in the target object sequence based on the context representation vector using the decoder comprises:
   processing, at the fully connected layer, the context representation vector into the first output vector;
   applying the softmax function to the first output vector at the regression layer to obtain the scores of the plurality of target objects; and
   outputting, at the output layer, the reranking of the plurality of target objects in the target object sequence based on the descending order of the scores of the plurality of target objects.

15. A non-transitory, computer-readable medium storing one or more instructions executable by a computer system to perform operations comprising:
   determining an initial ranking of a plurality of target objects in a target object sequence, wherein the initial ranking is performed in descending order based on correlation degrees between the plurality of target objects and a target user;
   obtaining a plurality of object features respectively corresponding to the plurality of target objects in the target object sequence;
   inputting, based on the initial ranking, the plurality of object features into a reranking model, wherein the reranking model comprises an encoder and a decoder;
   encoding the plurality of object features using the encoder to obtain a context representation vector corresponding to the target object sequence;
   obtaining a reranking of the plurality of target objects in the target object sequence based on the context representation vector using the decoder, wherein obtaining the reranking of the plurality of target objects comprises:
      processing the context representation vector into a first output vector, wherein the first output vector has a same number of dimensions as the plurality of target objects;
      applying a softmax function to the first output vector to obtain scores of the plurality of target objects; and
      outputting the reranking of the plurality of target objects in the target object sequence based on a descending order of the scores of the plurality of target objects; and
   displaying the target object sequence to the target user based on the reranking of the plurality of target objects.

16. The non-transitory, computer-readable medium according to claim 15, wherein obtaining the plurality of object features respectively corresponding to the plurality of target objects in the target object sequence comprises:
   obtaining attribute features respectively corresponding to the plurality of target objects in the target object sequence;
   obtaining the correlation degrees between the plurality of target objects and the target user;
   obtaining a user feature of the target user; and
   determining, for each target of the plurality of target objects, an object feature of the target object based on an attribute feature corresponding to the target object, a correlation degree between the target object and the target user, and the user feature of the target user.

17. The non-transitory, computer-readable medium according to claim 15, wherein the reranking model is configured to predict preference degrees of the target user with respect to the plurality of target objects, and rerank the plurality of target objects based on the preference degrees;
   wherein the reranking model is trained based on a sample object sequence, wherein a plurality of sample objects in the sample object sequence are arranged based on the initial ranking, wherein the plurality of sample objects have corresponding object features, wherein each object feature corresponding to a sample object is determined based on an attribute feature of the sample object, a correlation degree between the sample object and a sample user, and a user feature of the sample user, and wherein the sample object sequence has a sample label representing a user preference of the sample user with respect to each object of the plurality of sample objects.

18. The non-transitory, computer-readable medium according to claim 17, wherein the sample label is determined based on historical behavior data of the sample user, and wherein the historical behavior data comprise at least one of click data or conversion data.

19. The non-transitory, computer-readable medium according to claim 15, wherein the encoder comprises a transformer network, and wherein encoding the plurality of object features using the encoder to obtain the context representation vector corresponding to the target object sequence comprises:
   encoding the plurality of object features using the transformer network based on a multi-head attention mechanism to obtain the context representation vector corresponding to the target object sequence.

20. The non-transitory, computer-readable medium according to claim 19, wherein encoding the plurality of object features using the transformer network based on the multi-head attention mechanism comprises:
- determining query vectors, key vectors, and value vectors corresponding to the plurality of object features;
- determining a weight of a second object feature with respect to a first object feature based on a query vector corresponding to the first object feature and a key vector corresponding to the second object feature, wherein the first object feature and the second object feature comprise any two object features of the plurality of object features; and
- determining, based on weights of the plurality of object features with respect to the first object feature and the value vectors of the plurality of object features, an encoding vector of the first object feature to obtain encoding vectors corresponding to the plurality of object features.

* * * * *